United States Patent Office 3,375,243
Patented Mar. 26, 1968

3,375,243
METHOD OF PRODUCING ALKYL GLUCOSIDE COMPOSITIONS
Charles S. Nevin and Robert G. Short, Decatur, Ill., assignors to A. E. Staley Manufacturing Company, Decatur, Ill., a corporation of Delaware
No Drawing. Continuation-in-part of application Ser. No. 502,351, Oct. 22, 1965. This application Mar. 13, 1967, Ser. No. 622,476
13 Claims. (Cl. 260—210)

ABSTRACT OF THE DISCLOSURE

Preparation of alkyl glucoside compositions by the reaction of a saccharide with an alcohol in the presence of a water-soluble sulfonic acid catalyst.

---

This application is a continuation-in-part of allowed application Ser. No. 502,351, filed Oct. 22, 1965, and now abandoned.

This invention relates to the preparation of alpha alkyl glucoside compositions which comprises reacting a monosaccharide or a polysaccharide containing anhydroglucose units in the alpha configuration with an alcohol in the presence of a water-soluble sulfonic acid catalyst. More particularly, this invention relates to the preparation of alpha methyl glucoside compositions which comprises reacting starch or starch degradation product containing anhydroglucose units with methanol in the presence of a water-soluble sulfonic acid catalyst at a temperature of 100 to 250° C.

Alpha methyl glucoside is a well known commercially available product which can be prepared from starch and/or dextrose. For example, U.S. Patent 2,276,621 discloses reacting dry starch with methanol at a temperature of 65 to 100° C. (preferably 2 to 3 hours at 100° C.) in the presence of about 10 to 20 parts by weight of sulfuric acid catalyst per each 100 parts by weight methanol and a disequilibrate solution of a methyl glucoside. Excess methanol is distilled off to form a more concentrated system from which the desired methyl glucoside is crystallized. Attempts to speed up the rate of conversion to methyl glucoside by raising the reaction temperature have led to undesirable dehydration and charring of various sugars formed in the process.

The pure crystalline alpha methyl glucoside of commerce is commonly used for the preparation of polyurethane foams. In this use the alpha methyl glucoside is reacted with propylene oxide in order to form a high molecular weight highly branched polyol. Trade literature on alpha methyl glucoside discloses that the best method of hydroxypropylating the alpha methyl glucoside is to (1) dissolve the alpha methyl glucoside in water, (2) add potassium hydroxide as a catalyst for the subsequent hydroxypropylation step, (3) remove the water from the alpha methyl glucoside and then hydroxypropylate. It has been found that when this technique is employed using the pure alpha methyl glucoside of commerce hard, relatively unstirrable deposits form at the bottom of the reaction vessel upon the removal of water from the alpha methyl glucoside.

The general object of this invention is to provide a rapid method of preparing relatively inexpensive alpha alkyl glucoside directly from starch, oligosaccharide mixtures or monosaccharides. Another object of this invention is to provide a rapid method of preparing alpha methyl glucoside compositions which can be used without purification. Another object of this invention is to prepare a suitable alpha methyl glucoside composition which can be hydroxypropylated under standard conditions without the formation of a hard, unstirrable mass when operating under the above described conditions. Other objects will become apparent hereafter.

We have now found that it is possible to prepare light colored compositions comprising from about 70 to 95% by weight alpha alkyl glucoside by heating starch, alcohol and water-soluble sulfonic acid at a temperature of about 100° C. to 250° C. The product resulting from this reaction can be dissolved in water and hyproxypropylated in the manner described above without the formation of an unstirrable hard mass. The alpha methyl glucoside reaction product of this invention remains fluid even upon the removal of water since it has a lower melting point than the pure alpha methyl glucoside. Moreover, the resultant hyroxypropylated crude alpha methyl glucoside of this invention yields polyurethane foams which are comparable to polyurethane foams prepared with the commercially available pure crystalline alpha methyl glucoside.

In somewhat greater detail, the process of our invention comprises suspending a polysaccharide having anhydroglucose units in the alpha configuration (starch or starch degradation product) in alcohol and adding thereto or in the alcohol suspending medium a water-soluble sulfonic acid catalyst. The composition is heated under pressure at a temperature of about 100° C. to 250° C. The crude reaction product which contains about 70 to 95% by weight alpha alkyl glucoside is liberated from the reaction medium by vacuum distillation of unreacted alcohol and water from the reaction medium. The dried product is a friable yellow or light brown solid which does not require any purification for use in a preparation of polyurethane foams.

Suitable polysaccharides having anhydroglucose units in the alpha configuration include starch and starch degradation products. Suitable sources of starch include corn starch, wheat starch, potato starch, rice starch, tapioca starch, waxy maize, high-amylose corn starch, the amylopectin or amylose fractions thereof. The starches can be modified prior to use by acid hydrolysis, enzyme treatment (alpha amylase), alkaline hypochlorite, etc. More highly degraded starch products such as the commonly used corn syrups of commerce can also be employed. In general it is preferred to use the unmodified starches of commerce since they are cheaper and relatively little, if any, advantage has been found in the use of the more expensive materials. However, there are additional advantages in using the so-called resin refined corn syrups, which are preferably relatively low in dextrose, since these products do not contain protein and fat normally associated with the commercially available cereal starches. Accordingly, it is possible to avoid the presence of protein and/or fat which would normally be present in the use of native cereal starches.

The starches can be predried to a moisture content of less than about 3% or used as is (containing the normal moisture level of 5 to 14% by weight). Starch containing normal moisture cannot be converted as rapidly to alpha alkyl glucoside at lower reaction temperatures. In the temperature range of about 140° C. to 250° C. water has no apparent inhibiting effect. However, it has been found that predried starches form a somewhat smaller amount of dextrose by-product. For example, a predried starch yields an alpha methyl glucoside composition containing about 3% by weight dextrose. Other things being equal, a starch containing about 10% moisture yields an alpha methyl glucoside composition containing about 5% by weight dextrose. However, foams prepared from both compositions are comparable.

Suitable alcohols for use in our invention include methanol, ethanol, propanol, allyl alcohol, etc. Methanol is the alcohol of choice because of its low molecular weight and low cost. In general the lower alcohol is used in a concentration of about 0.67 to 19 parts by weight per part by weight polysaccharide (dry solids basis) having anhydroglucose units in the alpha configuration. If less than about 0.67 part alcohol is used, the reaction mixture tends to form a swollen mass which is difficult to mix. Further, as the concentration of alcohol increases, the tendency for localized charring of sugars formed during the reaction decreases. In general the minimum concentration of any alcohol used in this invention should be at least 3 moles per each anhydroglucose unit of polysaccharide. One the other hand, it is advisable to operate with as low a concentration of alcohol as possible in order to reduce the amount of alcohol that must be removed from the reaction mixture in order to liberate the alpha alkyl glucoside reaction product. Conveniently, the concentration of methanol can range from about 6 to 25 moles for each anhydroglucose unit in the reaction mixture.

Suitable water-soluble catalysts for use in our invention include o, m, p-toluene sulfonic acid, benzene sulfonic acid, o, m, p-bromobenzene sulfonic acid, ethane sulfonic acid, etc. We have found that the sulfonic acid catalysts are unique. Other strong acids such as hydrochloric acid are relatively ineffective in converting starch to alpha methyl glucoside under the conditions of our reaction. For example, hydrochloric acid reacts with the stainless steel reactor to yield a green reaction mixture containing large concentrations of unreacted starch. Phosphoric acid tends to decompose when heated in excess of 135° C. and yields very little of the desired alpha alkyl glucoside. Water-insoluble sulfonic acid ion exchange resins also fail to yield much of the desired product. When heated to 150° C. Amberlite IR-120, itself, decomposes. Sulfuric acid is somewhat more useful. However, conversion with sulfuric acid as indicated above leads to charred reaction products and correspondingly reduced yields of the desired product. Boron trifluoride etherate, which is effective as a catalyst for the conversion of starch-glycol mixtures to glycol glucosides, fails to yield any of the desired alpha alkyl glucoside. This is probably due to the deactivation of the catalyst by the monohydric alcohol.

The water-soluble sulfonic acid catalyst can be used in a concentration of about 0.0025 to 0.1 mole per mole polysaccharide. In general the higher the reaction temperature the lower the concentration of catalyst necessary to obtain the best results. In the preferred temperature range of about 140° C. to 180° C., it is rarely desirable to use more than 0.01 mole of catalyst per mole of polysaccharide. Excellent yields of the desired alpha alkyl glucoside are obtained in thirty minutes or less. However, when the reaction is carried out for about six and one-half hours at 100° C., 0.01 mole of catalyst is insufficient to yield any sizable concentration of the desired alpha alkyl glucoside even when using predried starches. Other things being equal (dried starch heated at 100° C. for six and one half hours), increasing the catalyst concentration to 0.05 mole results in the formation of an alpha alkyl glucoside composition containing about 85% by weight alpha alkyl glucoside. On the other hand, at temperatures in excess of about 140° C., as the concentration of catalyst increases above about 0.01 mole per mole of polysaccharide, the desired product becomes progressively darker.

As indicated above, the reactants of our invention are heated at a temperature of about 100° C. to about 250° C. in a sealed vessel. Reaction time is inversely proportional to the reaction temperature. In general it has been found that a temperature in the range of about 140 to about 180° C. is most practical, yielding the desired reaction in good yields in thirty minutes or less. As the temperature of the reaction is increased, there is more of a tendency for decomposition and color development in the final products. Further, at temperatures in excess of about 180° C. the reaction is extremely rapid. Below about 140° C. the reaction is somewhat slower and it is usually desirable to predry the polysaccharide to a moisture level of about 0.1 to 3%. Over the temperature range of 100° C. to 200° C., the autogenous pressure inside the reactor typically ranges from about 50 p.s.i.g., to about 575 p.s.i.g.

The crude alpha alkyl glucoside is recovered as a solid material by volatizing alcohol and water under reduced pressure. Conveniently, this may be accomplished by vacuum tray drying or by vacuum spray drying. The light colored alpha alkyl glycoside composition is friable and can be readily ground to form a free flowing solid.

As indicated above, the alpha alkyl glucoside composition typically contains 70 to 95% by weight pure alpha alkyl glucoside. The remainder of the composition comprises dextrose (up to about 10% by weight) and alkyl oligo-glycosides. If desired, pure alpha alkyl glucoside can be obtained by conventional isolation techniques. For example, it has been found that relatively pure (98–100%) alpha-methyl-D-glucoside crystallizes out on cooling the reaction mixture to room temperature when about 6 to 25 moles of methanol are employed per anhydroglucose unit.

While the instant invention is directed primarily to the preparation of alpha alkyl glucoside compositions from polysaccharides containing anhydroglucose units in the alpha configuration, this invention can be used to prepare alpha alkyl glucoside compositions from monosaccharides, such as dextrose. When a monosaccharide, such as dextrose, is used in place of the polysaccharide, essentially the same reaction conditions can be employed with the exception that the mole ratio of lower alcohol to monosaccharide can be as low as 1:1. This modification of the process is possible since it is possible to prepare fluid dextrose compositions simply by dissolving the dextrose in its water of hydration and/or the monohydric alcohol. Typically yields of 70 to 95% glucoside are obtained in this manner.

The following examples are merely illustrative and should not be construed as limiting the scope of our invention.

*Example I*

One hundred eighty grams granular (10% moisture) corn starch (162 grams dry solids basis—1 mole) was suspended in 360 grams methanol (11.25 moles) containing 0.95 grams p-toluene sulfonic acid monohydrate (0.005 mole). The composition was heated rapidly with stirring in a pressure reactor to 165° C. developing 275 p.s.i.g. pressure, held at 165° C. for ten minutes and cooled rapidly in a refrigerated water bath to 70° C. Water and methanol was distilled at 25 to 50 mm./Hg at a temperature of 60 to 80° C. The residue was a light tan solid which melted in the range of 105 to 135° C. Analysis by paper chromatography indicated that between 85 to 90% of the starch had been converted to methyl glucoside, 5% to dextrose and the remainder was a mixture of methyl oligo-glycosides.

Essentially the same results are obtained by replacing p-toluene sulfonic acid with p-bromobenzene sulfonic acid and ethane sulfonic acid.

*Example II*

Granular corn starch was dried in an oven at 105° to 110° C. in order to reduce the moisture content of the starch to 0.2 to 0.4% water. Four hundred eighty-six grams of the dried corn starch (3.0 moles) was suspended in 744 grams methanol (24.0 moles) containing 2.85 grams p-toluene sulfonic acid monohydrate (0.015 mole) in a pressure reactor. The composition was heated rapidly with stirring to 158 to 160° C. developing about 220 p.s.i.g. and held for ten minutes. The reactor was rapidly cooled to 70° C. and 12.3 ml. of aqueous alcohol potassium hydroxide solution (0.68 gram KOH/ml.) was added to neutralize most of the p-toluene sulfonic acid. The composition was dried on a vacuum tray at 60° C. at 26 inches vacuum. The caked product was ground and redried for several hours until the moisture level was 0.3%. The product was a cream colored free flowing powder which was hygroscopic, melting around 125 to 135° C. The product contained 86% by weight methyl-alpha-D-glucoside, 3.3% dextrose and the remainder was methyl oligo-glycosides. The concentration of methyl-alpha-D-glucose was determined by gas chromatography of the trimethylsilyl ether derivative of the reaction product and compared with a known standard.

*Example III*

This example illustrates the effect of catalyst concentration on reactions carried out at 100° C. The method described in Example I was repeated except that dried corn starch was used and the reaction was carried out at 100° C. for six and one-half hours developing approximately 50 p.s.i.g. pressure. The catalyst concentration employed in this example was varied as illustrated in the table below.

TABLE I

| Moles p-toluene sulfonic acid per mole of starch | 0.05 | 0.025 | 0.01 |
|---|---|---|---|
| Moles of dextrose formed per mole of starch | 0.0178 | 0.0185 | (*) |
| Moles of methoxyl formed per mole of starch | 0.845 | 0.77 | (*) |

*Little reaction as evidenced by large portion of unreacted starch.

The above data illustrates that substantially no conversion of polysaccharide material to alpha methyl glucoside is obtained using 0.01 mole p-toluene sulfonic acid catalyst at 100° C.

*Example IV*

This example illustrates how the reaction time is dependent upon the reaction temperature. In each case the reaction was carried out until there was substantial conversion of the starch to alpha methyl glucoside (at least 70% conversion).

TABLE 2

|  | Starch | | | | | |
|---|---|---|---|---|---|---|
|  | Dry | | | 10% moisture | | |
| Moles methanol per mole starch | 22.5 | 22.5 | 22.5 | 11.25 | 11.25 | 22.5 |
| Moles p-toluene sulfonic acid per mole of starch | 0.025 | 0.01 | 0.01 | 0.005 | 0.005 | 0.01 |
| Reaction temperature in degrees C | 115 | 150 | 150 | 158 | 165 | 180 |
| Reaction pressure in p.s.i.g. | 80 | 190 | 195 | 210 | 290 | 375 |
| Reaction time in minutes | 330 | 90 | 90 | 60 | 10 | 5 |
| Moles of dextrose formed per mole of starch | 0.016 | 0.021 | 0.048 | 0.056 | 0.058 | 0.042 |
| Moles of methoxyl formed per mole of starch | 0.845 | 0.835 | 0.872 | 0.865 | 0.885 | 0.780 |

From the above data it is readily apparent that as the reaction temperature increases, the rate of reaction increases.

It can also be seen from the above data that the use of dry starch results in the formation of markedly less dextrose by-product than when starch containing the normal moisture content is employed.

*Example V*

This example illustrates the use of a corn syrup sold under the name "Neto A" as the polysaccharide starting material. For purposes of this invention "Neto A," a mixture of oligosaccharides high in maltose, is assumed to have an average molecular weight of 167 grams per anhydroglucose unit. The technique described in Example I was repeated using 167 grams Neto A (dry solids basis containing approximately 20% by weight water) in place of the 162 grams of dry starch, and the reaction was carried out for 18 minutes. The methyl glucoside reaction product contained approximately 5.1% dextrose and about 85% by weight methyl glucoside.

Essentially the same results are obtained by replacing methanol with ethanol or propanol.

*Example VI*

This example illustrates the crystallization of methyl-alpha-D-glucoside from the starch-methanol reaction products. The method described in Example I was repeated and the methanol solution was cooled in an ice-water bath, with stirring, for 3 hours. The crystallized methyl-alpha-D-glucoside was filtered from the methanol solution and washed once with cold methanol. The methyl-alpha-D-glucoside was dried in an air oven at 70° C. for 16 hours. A yield of 25.2% of the theoretical solids content was obtained. This product had a melting point range of 165–170° C., and contained 98% methyl-alpha-D-glucoside as determined by gas chromatographic analysis of the trimethylsilyl ether derivative.

Higher yields of methyl-alpha-D-glucoside are obtained by reducing the amount of methanol used in the reaction or by distilling part of the methanol from the reaction medium prior to crystallization.

*Example VII*

This example illustrates the preparation of allyl-glucoside from starch. One hundred sixty-four grams of dried corn starch, containing 0.8% by weight moisture, was suspended in 174 grams allyl alcohol (3.0 moles) containing 1.9 grams p-toluene sulfonic acid monohydrate (0.01 mole). The composition was heated rapidly with stirring in a pressure reactor to 145° C. developing 60 p.s.i.g. pressure, held at 145° C. for fifteen minutes and cooled rapidly to room temperature in a refrigerated water bath. Water and allyl alcohol was distilled at 20 mm./Hg at 90° C. The residue was a gray solid, which melted above about 90° C. Analysis of this product showed a hydroxyl value of 964 mg. KOH/g., a copper number of 35, and a Wijs iodine value of 73.

*Example VIII*

This example illustrates the preparation of allyl glucoside from a monosaccharide. Four hundred and fifty grams of anhydrous dextrose (2.5 moles), 435 grams allyl alcohol (7.5 moles) and 2.37 grams p-toluene sulfonic acid monohydrate (0.0125 mole) was placed in a Parr stainless steel pressure reactor. The composition was heated rapidly with stirring to 125° C., developing 40 p.s.i.g. pressure, held at 125° C. for 15 minutes and cooled to 40° C. in a refrigerated water bath in about 5 minutes. Water and unreacted allyl alcohol were removed from the clear, pale-yellow solution by distillation at 20–22 mm./Hg at 95° C. The crude allyl glucoside residue, weighing 527 grams (96% of the theoretical yield if allyl glucoside were the only product), was a clear, yellow, resin-like semi-solid.

The dextrose content of the crude allyl glucoside was 6.1 weight percent by a glucose oxidase colorimetric analysis. Thin layer chromatography indicated that most of the product was allyl glucoside.

The allyl glucoside materials of Examples VII and VIII can be used as comonomers in the polymerization of typical vinylidene monomers, such as styrene, ethyl acrylate, methyl methacrylate, etc.

Since many embodiments of this invention may be made and since many changes may be made in the embodiments described, the foregoing is to be construed as illustrative only and our invention is defined by the claims appended hereafter.

We claim:

1. The process of preparing an alpha alkyl glucoside composition which comprises reacting at an elevated temperature under pressure a composition comprising at least one saccharide selected from the group consisting of a monosaccharide and a polysaccharide containing anhydro-glucose units in the alpha configuration with a lower alcohol in the presence of a water-soluble sulfonic acid catalyst.

2. The process of claim 1, wherein said lower alcohol is allyl alcohol.

3. The process of preparing an alpha alkyl glucoside composition which comprises reacting at an elevated temperature under pressure a composition comprising a polysaccharide containing anhydroglucose units in the alpha configuration with a lower alcohol in the presence of a water-soluble sulfonic acid catalyst.

4. The process of claim 3 wherein said polysaccharide is selected from the group consisting of starch and starch degradation products.

5. The method of claim 3 wherein said composition is reacted at a temperature of 100°–250° C.

6. The process of preparing a methyl glucoside which comprises reacting at an elevated temperature under pressure a composition comprising methanol and a polysaccharide containing anhydroglucose units in the alpha configuration in the presence of a water-soluble sulfonic acid catalyst, wherein methanol comprises from about 0.67 to 19 parts by weight per part by weight of polysaccharide on a dry solids basis.

7. The process of claim 6 wherein said reaction is carried out at 100–250° C.

8. The process of claim 6 werein said water-soluble sulfonic acid catalyst is used in a concentration of 0.0025 to 0.1 mole per mole of polysaccharide.

9. The method of claim 6 wherein said reaction is carried out at a temperature of about 140°–180° C.

10. The method of claim 6 wherein said sulfonic acid catalyst comprises p-toluene sulfonic acid.

11. The method of claim 9 wherein said reaction is carried out in less than 30 minutes.

12. The process of preparing a methyl glucoside which comprises heating under pressure a composition comprising methanol and starch in the presence of a water-soluble sulfonic acid catalyst, wherein methanol comprises from 6 to 25 moles per anhydroglucose unit of starch.

13. The method of claim 12 wherein methyl-alpha-D-glucoside is isolated in crystalline form by crystallization from the reaction product.

References Cited

UNITED STATES PATENTS

| | | | |
|---|---|---|---|
| 2,276,621 | 3/1942 | Langlois | 260—210 |
| 2,351,625 | 6/1944 | Miescher et al. | 260—210 |
| 2,606,186 | 8/1952 | Dean et al. | 260—210 |

LEWIS GOTTS, *Primary Examiner.*

J. R. BROWN, *Assistant Examiner.*